United States Patent [19]

Cane

[11] 4,016,360
[45] Apr. 5, 1977

[54] SYSTEM FOR REMOTELY CHECKING EQUIPMENT

[76] Inventor: Mario Cane, V. Bussoleno 99, Leumann-Collegno, Italy, 10096

[22] Filed: Dec. 30, 1975

[21] Appl. No.: 645,414

[30] Foreign Application Priority Data

Dec. 31, 1974 Italy ................................ 70798-74

[52] U.S. Cl. ............................ 179/2 A; 179/1 MN
[51] Int. Cl.² .................. H04M 1/24; H04M 11/00
[58] Field of Search ............... 179/1 MN, 2 A, 2 R, 179/2 AM

[56] References Cited

UNITED STATES PATENTS

| | | | |
|---|---|---|---|
| 3,548,102 | 12/1970 | Schaum et al. | 179/2 A |
| 3,647,971 | 3/1972 | Cushman et al. | 179/2 A |
| 3,787,624 | 1/1974 | Spitalny et al. | 179/2 A |

Primary Examiner—George G. Stellar
Attorney, Agent, or Firm—Browdy & Neimark

[57] ABSTRACT

A system for checking the operable conditions of one or more pieces of electrical equipment from a remote position includes an individual oscillator associated with each of the pieces of equipment to be checked. Switches which are responsive to the condition of the equipment are provided to connect the individual oscillators to a switching means. The switching means is operatively responsive to a call signal from a telephone line for effecting the coupling of signals from the oscillators to a telephone line. A timing circuit is provided to disconnect the oscillators from the telephone line after a given period of time expires. Each oscillator has a different distinctive output signal characteristic.

8 Claims, 2 Drawing Figures

SYSTEM FOR REMOTELY CHECKING EQUIPMENT

THE BACKGROUND OF THE INVENTION

This invention relates to a system for remotely checking the operative condition of pieces of equipment in order to verify that the pieces of equipment are in operable condition. In particular, the present invention relates to such a system for checking the operable condition of electrical equipment.

Systems of the above-mentioned type are particularly useful when pieces of electrical equipment, which have to be checked from a remote location, are anti-theft installations in apartments, homes, shops, rooms and the like which are to be protected against burglars and other persons unauthorized to enter. In these cases, it is particularly interesting for a user to be able to check from a remote point the operable condition of the anti-theft installation. In the following specification and claims, the term "operable condition" is used to indicate that the anti-theft installation is still as effective as when it was installed. The absence of operable condition consequently means that an alteration has occurred in the anti-theft installation system due, either to an equipment failure in the installation or to the fact that an alarm has been caused by a theft attempt or unauthorized entry.

SUMMARY OF THE INVENTION

The object of the present invention is to provide a system for remotely checking equipment, the system having a construction which is particularly simple, inexpensive and reliable.

The foregoing object, as well as others which are to become clear from the text below and the resulting advantages are achieved in accordance with the present invention by providing a system which includes at least one oscillator suitable for generating a low frequency electrical signal. Each oscillator is associated with a respective piece of electrical equipment to be checked. A circuit connects the oscillator or oscillators to a telephone line through the interposition of a respective switch, associated respectively with the individual oscillators. Each switch is coupled respectively to a respective piece of electrical equipment to be checked. The individual switches are preferably closed whenever their associated pieces of electrical equipment are in an operable condition and open whenever the associated pieces of equipment are inoperable. Of course, the opposite convention could be used as well. A switching means, which is automatically responsive to a call signal on the telephone line effects the connection of the line to the oscillator or oscillators, as the case may be, which place respective, distinctive, electrical signals on the line provided their respective switches are closed. A timing circuit suitably effects the release of the telephonic line after a pre-established time period has elapsed subsequent to the arrival of the call signal.

DETAILED DESCRIPTION OF THE PREFERRED EMBODIMENT

Figure 1:
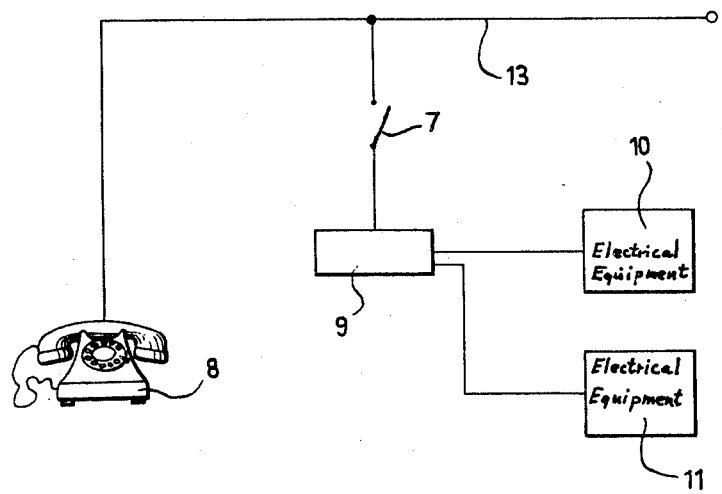
FIG. 1 is a block diagram of an exemplary system for the checking of the operable condition of pieces of electrical equipment from a remote position, according to the invention, the system being associated with a telephone line and hand set.

FIG. 1 shows a system 9 for checking the operable condition of pieces of electrical equipment 10 and 11, which may be intruder or burglar warning installations or the like. The system 9 is connectable, via a switch 7, to a telephone line 13 feeding a telephone hand set 8. As illustrated, the switch 7 is open.

Figure 2:
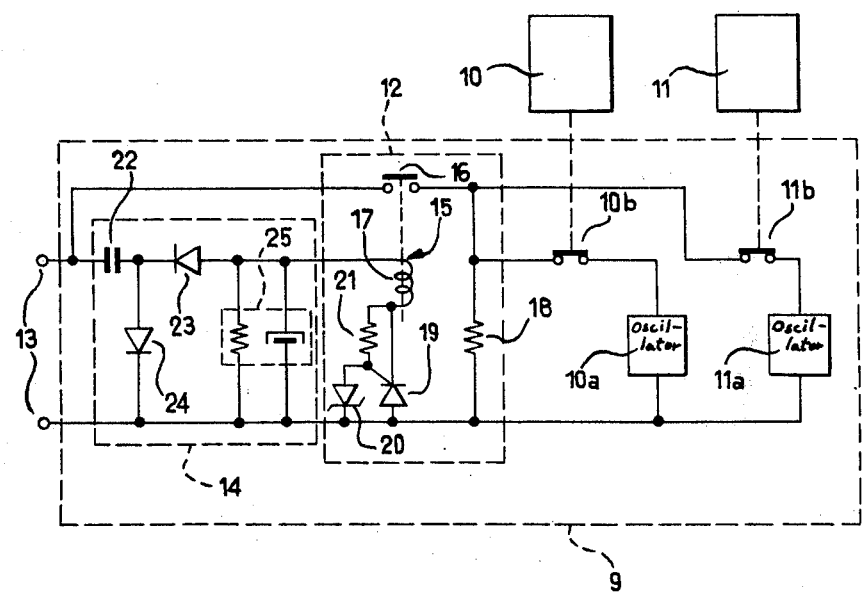
FIG. 2 is a detailed schematic circuit diagram of the system for checking the operable condition of electrical equipment from a remote position, represented in FIG. 1.

The system 9, as illustrated, includes oscillators 10a, 11a (FIG. 2) respectively associated with the respective pieces of electrical equipment 10 and 11. Each piece of electrical equipment 10 and 11 controls respectively a respective switch 10b and 11b which selectively connect respective oscillators 10a and 11a in parallel with a load resistor 18. The switches 10b and 11b are closed whenever their respectively associated pieces of electrical equipment 10 and 11 are in an operable condition, the respective switches 10b and 11b are respectively open whenever the pieces of electrical equipment 10 and 11 are in an inoperable condition. It is to be appreciated that the opposite convention could be used instead, the closing of the individual switches 10b and 11b indicating a failure in the respective pieces of electrical equipment 10 and 11, with the opening of these respective switches indicating operability of the respective pieces of electrical equipment 10 and 11.

When more than one piece of equipment is to be checked, more than one oscillator must be used. Thus, each of the oscillators must produce a signal which is different and distinct from the signals produced by the other oscillators. For example, each oscillator could produce a signal which has a frequency different from the frequencies of the other oscillators.

The load resistance 18, due to action of a switching means 12, controlled by a timing circuit 14, can be connected in parallel with the telephone line 13 upon the arrival of a call signal on the telephone line 13. The switching means 12, as illustrated, includes a relay 15 having contacts 16 which connect the load resistance 18 to the telephone line 13 whenever the relay 15 is energized. An activating coil 17 of the relay 15 is series connected to one principal electrode of a conventional controlled rectifier 19 which has a Zener diode 20 connected in parallel with its control electrode and anode. The anode of the Zener diode 20 is connected via a resistance 21 to the cathode of the controlled rectifier 19.

A timing circuit 14 includes an input capacitor 22 connecting a first diode 24 across the telephone line 13. One terminal of the input capacitor 22, which is not connected to the telephone line 13, is connected to the anode of the first diode 24 and to the cathode of the second diode 23. A parallel RC circuit 25 is connected between the anode of the second diode 23 and the cathode of the first diode 24. The capacitor of the RC circuit 25 has a capacity of, for example, 1,000 microfarads, much greater than the capacity of the input capacitor 22 which is, for example, 2.2 microfarads. The series circuit which includes the coil 17 of the relay 15 and the controlled rectifier 19 is connected in parallel with respect to the RC circuit 25. The relay 15 is a relay which remains energized for voltages in the range of from 8 volts to 40 volts; the zener diode 20 is a diode having a zener voltage of about 33 volts. The component sizes and types are given by way of example. These components have been selected, taking into account the conventional voltage levels available on telephone lines. It is to be appreciated that variations are possible and that the invention can be adapted to use with lines using different voltage levels and/or call signals.

OPERATION

Upon the arrival of a call signal on the telephone line 13, due to the passing of signal pulses of one polarity through the input capacitor 22 and the diode 23, to the RC circuit 25, and after a certain number of call signal pulses, the voltage present on the capacitor of the RC circuit 25 reaches its highest value. The relay 15 becomes energized only when the capacitor of the RC circuit 25 has reached this given maximum voltage. When the relay 15 is energized, the contacts 16 close and connect the telephone line 13 across the load resistance 18. Since at that moment, provided the pieces of electrical equipment 10 and 11 to be checked are operable, the distinctive low frequency signals generated by the oscillators 10a and 11a are fed to the telephone line 13 via the contacts 16. In this situation, the user hears in the earpiece of the hand set 8 (FIG. 1) the two different low frequency signals from the oscillators 10a and 11a. He can conclude consequently that the pieces of equipment 10 and 11 are in operable condition. If one of the two pieces of equipment 10 and 11 is inoperable, the user will not hear the corresponding signal of that one of the oscillators 10a and 11a associated with the inoperable piece of equipment.

Whenever the contacts 16 close, the voltage discharge of the capacitor of the RC circuit 25 starts. The discharge time constant selected for the discharge depends principally on the particular features of the relay 15, its coil 17 and the characteristics of the controlled rectifier 19. Whenever the voltage across the RC circuit 25 drops below the level of about 8 volts, for example, the relay 15 de-energizes causing the opening of the contacts 16 and thereby the disconnection of the telephone line 13 from the oscillators 10a and 11a. The resistor of the RC circuit 25 assures that the capacitor will not remain charged between arrivals of call signals, to any significant voltage, which would cause an undesirable alteration in the operation of the timing circuit 14.

It is to be appreciated that the foregoing illustrative embodiment of the system according to the present invention has been set out by way of example. Other embodiments and variants are possible without departing from the spirit and scope of the invention, its scope being defined in the appended claims.

What is claimed is:

1. A system for remotely checking the operable condition of at least one piece of electrical equipment, the system comprising:
   a switch means responsive to the operable condition of said one piece of electrical equipment;
   an oscillator means for generating a distinctive low frequency electrical signal, its output being connected to said switch means;
   a switching means in series with said switch means for selectively coupling and output signal from said oscillator means directly to a telephone line, said switching means including a controlled rectifier having a cathode, an anode and a control electrode, said anode and said control electrode being coupled respectively to the cathode and anode of a first diode, which is a Zener diode, said Zener diode having its anode connected, via a resistance, in series with an energizing coil of a relay forming at least part of said switching means;
   means responsive to a call signal on the telephone line for effecting closing of said switching means upon arrival of a call signal; and
   timing means for effecting opening of said switching means upon expiration of a given period of time subsequent to receipt of a call signal;
   whereby a user may place a call signal on the telephone line and determine if the oscillator means is supplying a distinctive signal directly to the telephone line as an indication of the operable condition of the piece of equipment.

2. A system according to claim 1, wherein said switching means comprises said relay provided with said energization coil fed by the telephone line via said timing means and whose contacts effect the parallel connection to the telephone line of a load resistance whenever said relay is energized.

3. A system according to claim 1, wherein said switch means is closed whenever its associated piece of electrical equipment is operable.

4. A system according to claim 1, wherein said timing means comprises an input capacitor which parallely connects the telephone line to a second diode, a terminal of said input capacitor being connected to the anode of said second diode and to the cathode of a third diode, and an RC circuit connected between the anode of said third diode and the cathode of said second diode.

5. A system according to claim 4, wherein a series circuit, comprising said energization coil of said relay and said controlled rectifier is connected in parallel with said RC circuit.

6. A device according to claim 4, wherein said RC circuit is constituted by a capacitor and a resistor connected in parallel, said capacitor having a capacitive value higher than the capacitive value of said input capacitor.

7. A system according to claim 1, further comprising at least one additional switch means and at least one additional oscillator means, each of said additional switch means being responsive to the operative condition of respective additional pieces of electrical equipment and each of said oscillator means generating signals distinct from each other oscillator means.

8. A system according to claim 7, wherein each of said switch means is closed whenever its respective associated piece of electrical equipment is operable.

* * * * *